(12) United States Patent
Liu

(10) Patent No.: US 11,307,096 B2
(45) Date of Patent: Apr. 19, 2022

(54) SPECTRAL RESOLUTION ENHANCEMENT DEVICE

(71) Applicant: HUAZHONG UNIVERSITY OF SCIENCE AND TECHNOLOGY, Hubei (CN)

(72) Inventor: Chen Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/351,164

(22) Filed: Jun. 17, 2021

(65) Prior Publication Data

US 2021/0318170 A1    Oct. 14, 2021

Related U.S. Application Data

(63) Continuation of application No. PCT/CN2019/119943, filed on Nov. 21, 2019.

(30) Foreign Application Priority Data

Sep. 17, 2019  (CN) .......................... 201910875595.8

(51) Int. Cl.
*G01J 3/28*   (2006.01)
*G01J 3/02*   (2006.01)
(Continued)

(52) U.S. Cl.
CPC ........... *G01J 3/2823* (2013.01); *G01J 3/0208* (2013.01); *G02B 5/1842* (2013.01); *G01J 2003/1842* (2013.01)

(58) Field of Classification Search
CPC ................... G01J 3/2823; G01J 3/0208; G01J 2003/1842; G01J 3/18; G01J 3/28;
(Continued)

(56) References Cited

U.S. PATENT DOCUMENTS 4,105,290 A * 8/1978 Quinn ................ G02B 27/4233
                                                   359/571
5,946,128 A   8/1999 Paek

FOREIGN PATENT DOCUMENTS

CN         101281061        10/2008
CN         102539360         7/2012
(Continued)

*Primary Examiner* — Abdullahi Nur
(74) *Attorney, Agent, or Firm* — JCIPRNET

(57) ABSTRACT

A spectral resolution enhancement device including a preliminary dispersion unit, a two-grating angular dispersion amplification unit, and a detection unit is provided. The preliminary dispersion unit is configured to receive collimated incident light and emits light of different wavelengths in the incident light at different angles. The two-grating angular dispersion amplification unit is configured to diffract the light of different wavelengths and emitted from the preliminary dispersion unit multiple times, such that angular dispersion the light of different wavelengths is enhanced, and emergent angle deviations between the light of different wavelengths are increased. The detection unit is configured to detect light of different wavelengths and emitted from the two-grating angular dispersion amplification unit. Since the emergent angle deviations of light of different wavelengths are increased, resolution of the detection unit for the light of different wavelengths is increased.

7 Claims, 4 Drawing Sheets

(51) Int. Cl.
*G02B 5/18* (2006.01)
*G01J 3/18* (2006.01)

(58) Field of Classification Search
CPC .. G01J 3/02; G01J 3/45; G02B 5/1842; G02B 5/1861; G02B 27/4272
See application file for complete search history.

(56) References Cited

FOREIGN PATENT DOCUMENTS

| | | |
|---|---|---|
| CN | 108593108 | 9/2018 |
| CN | 108759722 | 11/2018 |
| KR | 100784834 | 12/2007 |

\* cited by examiner

SPECTRAL RESOLUTION ENHANCEMENT DEVICE

CROSS-REFERENCE TO RELATED APPLICATIONS

This application is a continuation of international PCT application serial no. PCT/CN2019/119943, filed on Nov. 21, 2019, which claims the priority benefit of China application no. 201910875595.8, filed on Sep. 17, 2019. The entirety of each of the above-mentioned patent applications is hereby incorporated by reference herein and made a part of this specification.

BACKGROUND

Technical Field

The disclosure relates to a spectrum measurement field, and in particular, relates to a spectrometer.

Description of Related Art

The resolution of a spectrometer used for spectrum measurement is an important indicator because the resolution of the spectrometer determines the ability of the spectrometer to analyze the details of the spectrum. Nevertheless, the resolution of a common spectrometer is generally limited by the dispersive elements, such as the limited groove number of diffractive grating and the index of refraction of the prism material. In order to obtain high spectral resolution, it is necessary to enhance the spectral resolution of common spectrometers. At present, the commonly used methods for enhancing spectral resolution mainly include the ultra-high resolution spectral measurement provided by the cascade tunable Fabry-Perot interferometer, the high-resolution spectrometers based on the virtual imaged phased array (VIPA), and the use of arrayed waveguide grating (AWG) to obtain higher diffraction orders to achieve high-resolution spectral measurement. Nevertheless, the Fabry-Perot interferometer requires high-precision scanning, the virtual imaged phased array (VIPA) has low light energy utilization and the system is huge and complex, and the arrayed waveguide grating (AWG) needs to correct the phase of the arrayed waveguide. Therefore, the development of a spectral resolution enhancement device exhibiting high precision, small structure, and strong applicability is an important issue.

SUMMARY

According to the above technical defects, the disclosure aims to solve the technical problem in existing spectrum measurement that volume and energy efficiency of a spectrum measurement are required to be sacrificed for resolution as well as the technical problem of lack of practicality.

To achieve the above purpose, the disclosure provides a spectral resolution enhancement device including a preliminary dispersion unit, a two-grating angular dispersion amplification unit, and a detection unit.

The preliminary dispersion unit is configured to receive collimated incident light and light of different wavelengths in the incident light is emitted at different angles.

The two-grating angular dispersion amplification unit is configured to diffract the light emitted from the preliminary dispersion unit multiple times, such that angular dispersion of the light is enhanced, and emergent angle deviations between the light of different wavelengths are increased.

The detection unit is configured to detect light of different wavelengths emitted from the two-grating angular dispersion amplification unit, and since the emergent angle deviations of light of different wavelengths are increased, the spectral separation on the detection unit for the light of different wavelengths is increased.

Optionally, the preliminary dispersion unit includes: an incident slit, a collimating lens, and a diffraction grating.

The incident light is incident through the incident slit.

The collimating lens is configured to collimate the incident light passing through the incident slit and then emit the incident light in parallel.

The diffraction grating is configured to receive the incident light emitted from the collimating lens and emit light of different wavelengths in the incident light at different angles.

Optionally, the two-grating angular dispersion amplification unit includes a first blazed grating and a second blazed grating.

The first blazed grating receives the light of different wavelengths and diffracts the light of different wavelengths to the second blazed grating.

The second blazed grating receives the light of different wavelengths diffracted from the first blazed grating and diffracts the light of different wavelengths to the first blazed grating, and the foregoing is repeated.

Finally, diffracted light of different wavelengths is emitted to the detection unit after being diffracted by the first blazed grating or the second blazed grating.

Optionally, when the diffracted light of different wavelengths is emitted to the detection unit after being diffracted by the first blazed grating, an incident angle of the light is changed from being greater than a Littrow angle to being less than the Littrow angle when the light is diffracted multiple times between the first blazed grating and the second blazed grating through the arrangement of positions of the first blazed grating and the second blazed grating.

The detection unit includes: a beam splitter, an imaging lens, and a detector.

The beam splitter is configured to emit the diffracted light of different wavelengths to the imaging lens.

The imaging lens is configured to focus the emitted light of different wavelengths on the detector.

The detector is configured to detect the light of different wavelengths emitted from the two-grating angular dispersion amplification unit.

Optionally, when the diffracted light of different wavelengths is emitted to the detection unit after being diffracted by the second blazed grating, the incident angles of the light are all kept to be less than Littrow angle when the light is diffracted multiple times between the first blazed grating and the second blazed grating through arranging the positions of the first blazed grating and the second blazed grating.

The detection unit includes: an imaging lens and a detector.

The imaging lens is configured to focus the emitted light of different wavelengths on the detector.

The detector is configured to detect the light of different wavelengths emitted from the two-grating angular dispersion amplification unit.

Optionally, by arranging the positions of the first blazed grating and the second blazed grating, the incident angle of the light is changed from being greater than the Littrow angle to being less than the Littrow angle when the light is diffracted multiple times between the first blazed grating and the second blazed grating. When the incident angle reaches the Littrow angle after being diffracted multiple times, the diffraction angle is identical to the incident angle, and a light beam is emitted to the beam splitter after being diffracted multiple times in reverse direction alone an original diffraction path.

Optionally, angular dispersion of $j^{th}$ grating diffraction is $D_j$, and a recurrence relationship is:

$$D_j = \frac{\cos(i_j)}{\cos(\theta_j)} D_{j-1} + \frac{m}{d\cos(\theta_j)}$$

Where $D_{j-1}$ is angular dispersion of $(j-1)^{th}$ grating diffraction, $i_j$ is an incident angle of $j^{th}$ diffraction, $\theta_j$ is a diffraction angle of the $j^{th}$ diffraction, m is a diffraction order of blazed grating, and d is a grating constant.

Optionally, if the diffracted light of different wavelengths is emitted to the detection unit after being diffracted by the first blazed grating, the width of incident light beam received by the detection unit does not change, the size of imaging speckle does not change, and the angular dispersion multiple of the light of different wavelengths is the spectral resolution enhancement multiple through the device.

If the diffracted light of different wavelengths is emitted to the detection unit after being diffracted by the second blazed grating, the incident light beam received by the detection unit is reduced, the divergence angle of the reduced light beam is expanded, the angular spectrum distribution is increased, the imaging speckle is increased, and spectral resolution of the device is the full width at half maximum of a detected speckle.

In general, the above technical solutions provided by the disclosure have the following beneficial effects compared with the related art:

In the spectral resolution enhancement device provided by the disclosure, the two-grating structure is compact, and the occupied volume is small, so that the device may be conveniently used and integrated. The enhancement of two-grating spectral resolution is nonlinearly distributed along with wavelength, so that the distribution region with high multiples may be used in fine spectrum analysis, and the distribution region with low multiples may be used in coarse spectrum analysis. In the grating spectral resolution enhancement device, the angular dispersion may be magnified by 10 to 100 times in space, such that the device is suitable for various fine spectrum analyses. The spectrum measurement range may be changed through rotation of the diffraction grating in the preliminary dispersion unit, and adjustable spectrum measurement is thereby achieved.

Figure 1:
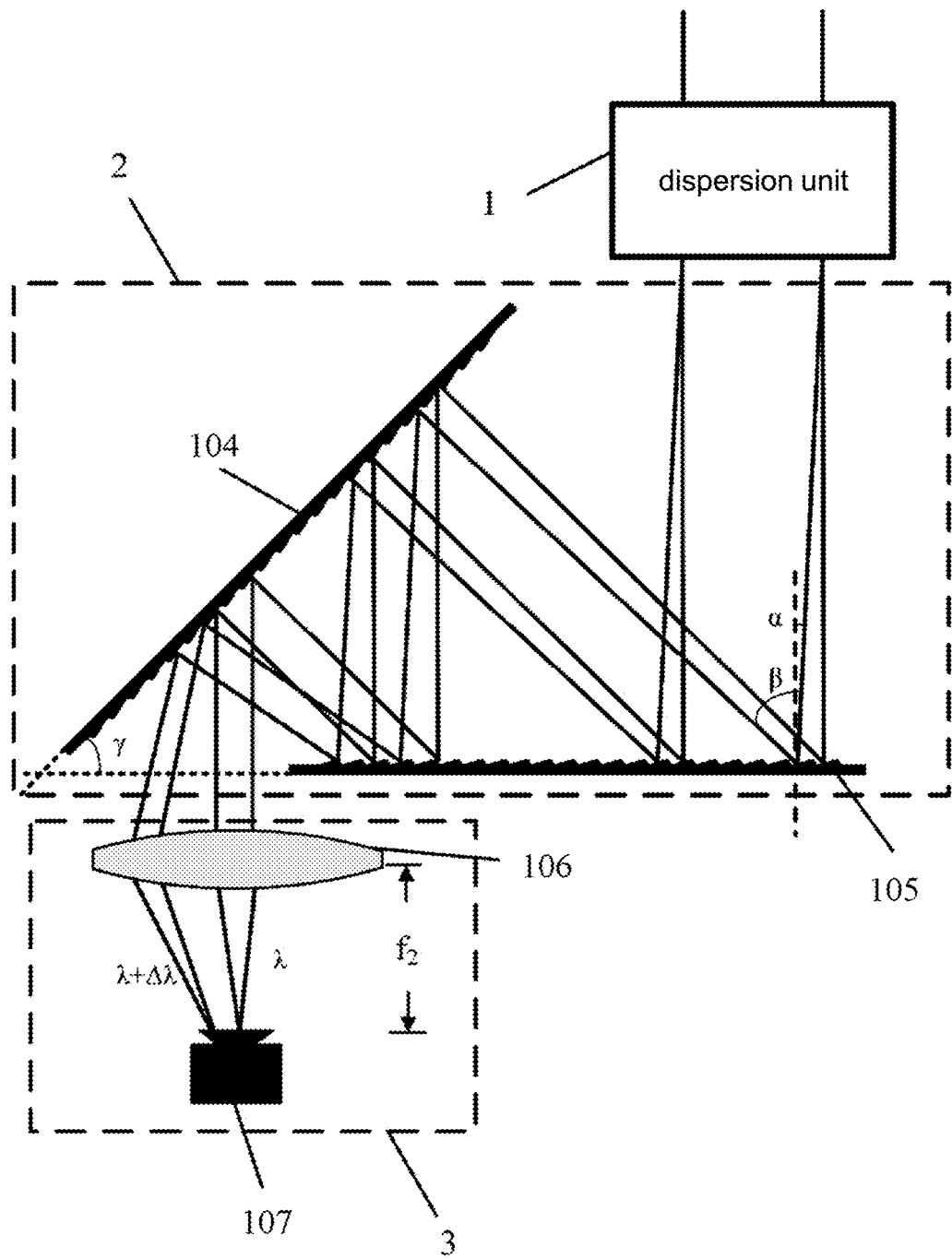
FIG. 1 is a schematic diagram of a spectral resolution enhancement device based on two gratings provided by the disclosure.

In all the attached drawings, the same reference numerals are used to represent identical or similar elements or structures, and 1 is a preliminary dispersion unit, 2 is a two-grating angular dispersion amplification unit, 3 is a detection unit, 101 is an incident slit, 102 is a collimating lens, 103 is a diffraction grating, 104 and 105 are two blazed gratings of the two-grating angular dispersion amplification unit, 106 is an imaging lens, 107 is a detector, and 108 is a beam splitter.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

In view of the defects of the related art required to be improved, the disclosure provides a spectral resolution enhancement device to improve the resolution of a conventional spectrometer within a specific spectrum range, and the device is small in size and easily integrated.

The disclosure provides a spectral resolution enhancement device including a preliminary dispersion unit, a two-grating angular dispersion amplification unit, and a detection unit.

The preliminary dispersion unit includes a diffraction grating, which is used to preliminarily separate different frequency components of input signal light in space, such that input light signals are emitted at different angles.

The two-grating angular dispersion amplification unit includes two blazed gratings.

The detection unit includes an imaging lens and a photodetector. The imaging lens is configured to focus the incident light on the photodetector, and the photodetector is an imaging device CCD or CMOS.

In an optional embodiment, if the center wavelength of signal light to be measured is $\lambda_c$, the angle of first grating in the two-grating angular dispersion amplification unit is set, incident angle and diffraction angle are relative to the grating normal, the incident angle of the signal light with center wavelength $\lambda_c$ is set to be $\alpha$, the diffraction angle is set to be $\beta$, and the incident angle and the diffraction angle satisfy a grating equation. The included angle between the second grating and the first grating is set to be $\gamma$, the incident angle of the signal light with center wavelength $\lambda_c$ passing through the second grating is $\beta$-$\gamma$. The light beam is diffracted multiple times between the two gratings, and the relative position of the two gratings is set to adjust the number of back and forth diffraction in the double gratings. The light beam is diffracted multiple times, and multiple diffraction amplification of the angular dispersion is achieved. In addition, by changing the incident angle α, different angular dispersion enhancement multiples may be obtained, and different degrees of spectral resolution enhancement may thus be achieved.

In an optional embodiment, the device is divided into two structures, namely the transmissive structure and the reflective structure. When the light beam is reflected multiple times between the gratings and the incident angles change from being greater than a Littrow angle to being less than the Littrow angle, the light beam is reflected to the incident window through the first blazed grating, which is the reflective structure at this time. When the light beam is reflected multiple times between the gratings and the incident angles are less than the Littrow angle, the light beam is emitted from the exit opening through a second blazed grating, which is a transmissive structure at this time.

In an optional embodiment, angular dispersion of $j^{th}$ grating diffraction is $D_j$, and a recurrence relationship is:

$$D_j = \frac{\cos(i_j)}{\cos(\theta_j)} D_{j-1} + \frac{m}{d\cos(\theta_j)}$$

Where $D_{j-1}$ is angular dispersion of $j-1^{th}$ grating diffraction, $i_j$ is the incident angle of $j^{th}$ diffraction, $\theta_j$ is the diffraction angle of the $j^{th}$ diffraction, m is the diffraction order of a blazed grating, and d is the grating constant. Based on the recurrence relationship, angular dispersion amplification is formed by two parts. The first part on the right is an angular dispersion amplification factor determined by the grating incident angle and diffraction angle. If $$\frac{\cos(i_j)}{\cos(\theta_j)} \geq 1,$$

the angular dispersion may be amplified successively. The second part is the angular dispersion of each diffraction of the grating. After multiple diffractions, the angular dispersion is superimposed multiple times, and the angular dispersion amplification is achieved in this way.

In an optional embodiment, the angular dispersion and wavelength exhibits a specific non-linear relationship. The angular dispersion of each wavelength can be calculated according to the grating equation. The relationship between the angular dispersion magnification and wavelength is calibrated with a light detector at the detection surface, and finally obtained spectrum can be calibrated.

In an optional embodiment, the spectrum measurement range of the device is determined by the two-grating angular dispersion amplification unit, that is, the wavelength range where the last diffracted light may exit from the exit window of the two-grating structure. If the diffraction angle exceeds π/2, the light beam becomes an evanescent wave, so the maximum diffraction angle is $$\theta_{max} = \frac{\pi}{2},$$

the diffraction angle of the wavelength λmax is π/2, and the diffraction angle of the light emitted from the first grating edge is $\theta_{min}$. In order to ensure that the diffracted light may be emitted, the diffraction angle is required to be greater than $\theta_{min}$, such that the corresponding signal light wavelength is $\lambda_{min}$ when the diffraction angle is $\theta_{min}$.

FIG. 1 is a schematic diagram of a spectral resolution enhancement device based on two gratings provided by the disclosure. As shown in FIG. 1, a preliminary dispersion unit 1, a two-grating angular dispersion amplification unit 2, and a detection unit 3 are included. The light to be measured first passes through the preliminary dispersion unit, so that the light of different wavelengths is emitted at different angles, and the light then passes through the two-grating angular dispersion amplification unit, which makes the light of different wavelengths separate at a larger angle, and the light finally passes through the detection unit for spectral measurement.

Preferably, the preliminary dispersion unit 1 includes a diffraction grating, which is used to preliminarily separate different frequency components of input signal light in space, such that the input light signal is emitted at different angles.

Further, light of different wavelengths may be changed to be allowed to perpendicularly enter the first grating of the two-grating angular dispersion amplification unit through rotating the first diffraction grating, and that the spectrum measurement range is expanded.

Preferably, the two-grating angular dispersion amplification unit includes two blazed gratings 104 and 105 with identical parameters.

Further, if the center wavelength of the signal light to be measured is $\lambda_c$, the first grating angle in the two-grating angular dispersion amplification unit is set, the incident angle and the diffraction angle are relative to the grating normal, the incident angle of the signal light with central wavelength $\lambda_c$ is set to be α, and the diffraction angle is set to be β. The angle between the second grating and the first grating is set to be γ, the light beam is diffracted multiple times between the two gratings, and the relative position of the two gratings is set to adjust the number of back and forth diffractions between the two gratings in the double gratings. The light beam is diffracted multiple times, and multiple diffraction amplification of the angular dispersion is achieved.

Further, regarding the two-grating angular dispersion amplification unit 2, the angular dispersion of the $j^{th}$ grating diffraction is $D_j$, and the recurrence relationship is:

$$D_j = \frac{\cos(i_j)}{\cos(\theta_j)} D_{j-1} + \frac{m}{d\cos(\theta_j)}$$

Where $D_{j-1}$ is angular dispersion of the $j-1^{th}$ grating diffraction, $i_j$ is the incident angle of the $j^{th}$ diffraction, $\theta_j$ is the diffraction angle of the $j^{th}$ diffraction, m is the diffraction order of the blazed grating, and d is the grating constant. The angular dispersion magnification is determined by grating parameter, the incident angle, and the number of diffractions.

Further, the amplified angular dispersion and the wavelength exhibits a nonlinear relationship. The angular dispersion of each wavelength is calculated according to the grating equation. The relationship needs to be calibrated with a detector at the, obtaining the relationship between the angular dispersion multiple and the wavelength, and finally calibrating the obtained spectrum.

Preferably, the detection unit 3 includes an imaging lens 106 and a photodetector 107. The focal length of the imaging lens is $f_2$, the imaging lens is configured to focus the incident light on the photodetector, and the photodetector is a CCD or CMOS and is configured to measure spectral distribution of the incident light.

Figure 2:
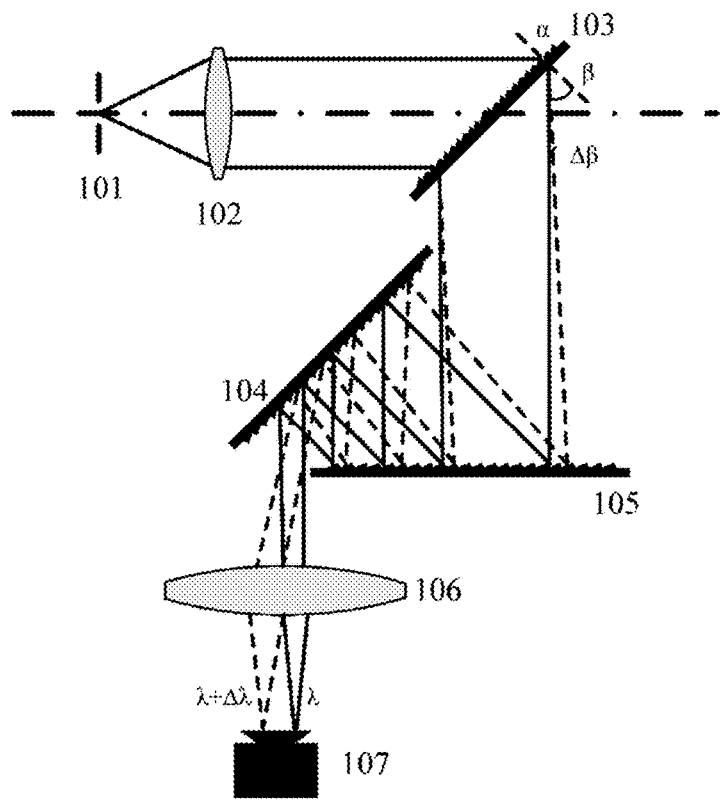
FIG. 2 is a schematic diagram of a structure of a transmissive spectral resolution enhancement device based on two gratings provided by an embodiment of the disclosure.
Figure 3:
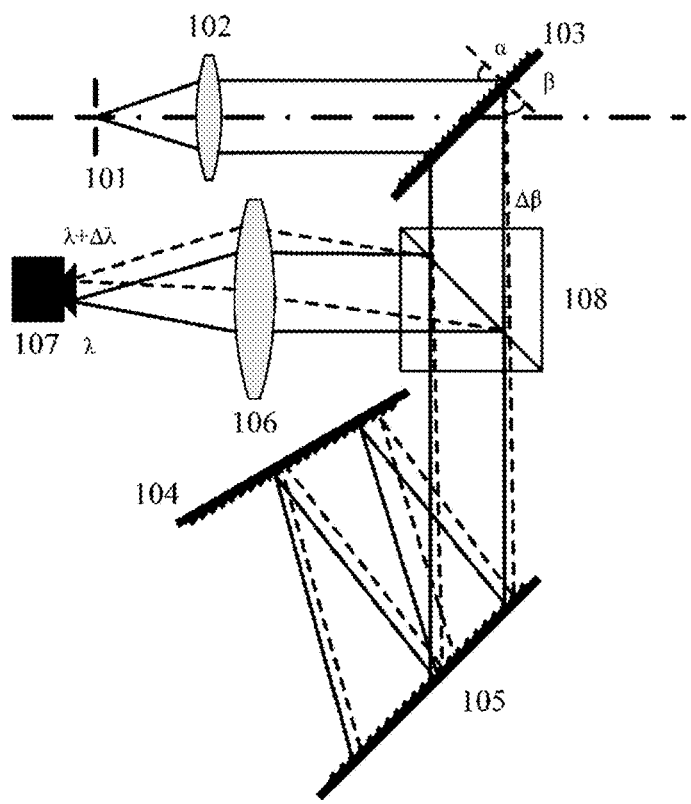
FIG. 3 is a schematic diagram of a structure of a reflective spectral resolution enhancement device based on two gratings provided by an embodiment of the disclosure.

In the embodiments provided by the disclosure, the transmissive spectral resolution enhancement device based on two gratings and the reflective spectral resolution enhancement device based on two gratings are respectively shown in FIG. 2 and FIG. 3, the two-grating angular dispersion amplification unit is integrated into a common grating spectrometer in both the embodiments.

The transmissive spectral resolution enhancement device based on two gratings includes: an incident slit 101, a collimating lens 102, a diffraction grating 103, two-grating angular dispersion amplification unit (104 and 105), an imaging lens 106, and a detector 107. Light beams with wavelengths $\lambda$ and $\lambda+\Delta\lambda$ are collimated and emitted through the collimating lens 102 in parallel after passing through the incident slit 101. An aperture stop of a system is b. After being diffracted by the aperture and then passing through the diffraction grating 103, the light beams with two wavelengths have different diffraction angles, and the emitted light enters the two-grating angular dispersion amplification unit (104 and 105) at different incident angles. After multiple times of diffraction, the angles of the emitted light beams with two wavelengths increase due to angular dispersion magnification, and the light beams then pass through the imaging lens 106 and are imaged on the detector 107.

The reflective spectral resolution enhancement device based on two gratings includes: the incident slit 101, the collimating lens 102, the diffraction grating 103, the two-grating angular dispersion amplification unit (104 and 105), the imaging lens 106, the detector 107, and a beam splitter 108. The light beams with wavelengths $\lambda$ and $\lambda+\Delta\lambda$ are collimated and emitted through the collimating lens 102 in parallel after passing through the incident slit 101. The aperture stop of the system is b. After being diffracted by the aperture, passing through the diffraction grating 103, and then passing through the beam splitter 108, since the light beams with two wavelengths have different diffraction angles, the emitted light enters the two-grating angular dispersion amplification unit (104 and 105) at different incident angles. After multiple times of diffraction, the incident angle is close to the Littrow angle, so the diffraction angle is the same as the incident angle. After multiple times of diffraction again, the light beams finally return to the beam splitter 108, pass through the imaging lens 106, and then are imaged on the detector 107.

Under the condition that a Rayleigh criterion is met, a minimum resolvable wavelength interval of a common grating spectrometer is:

$$\Delta\lambda = \left(\frac{\lambda}{a} + \frac{b}{f_1}\right)\left(\frac{d\theta}{d\lambda}\right)^{-1}$$

Where a is the incident slit width, $f_1$ is the focal length of the collimating lens (102), and $d\theta/d\lambda$ is the total angular dispersion. Therefore, without changing the size of the incident slit, the aperture stop, and the focal length of the collimating lens, increase in the angular dispersion may reduce the minimum resolvable wavelength of the spectrometer, that is, the resolution of the spectrometer is increased.

Figure 4:
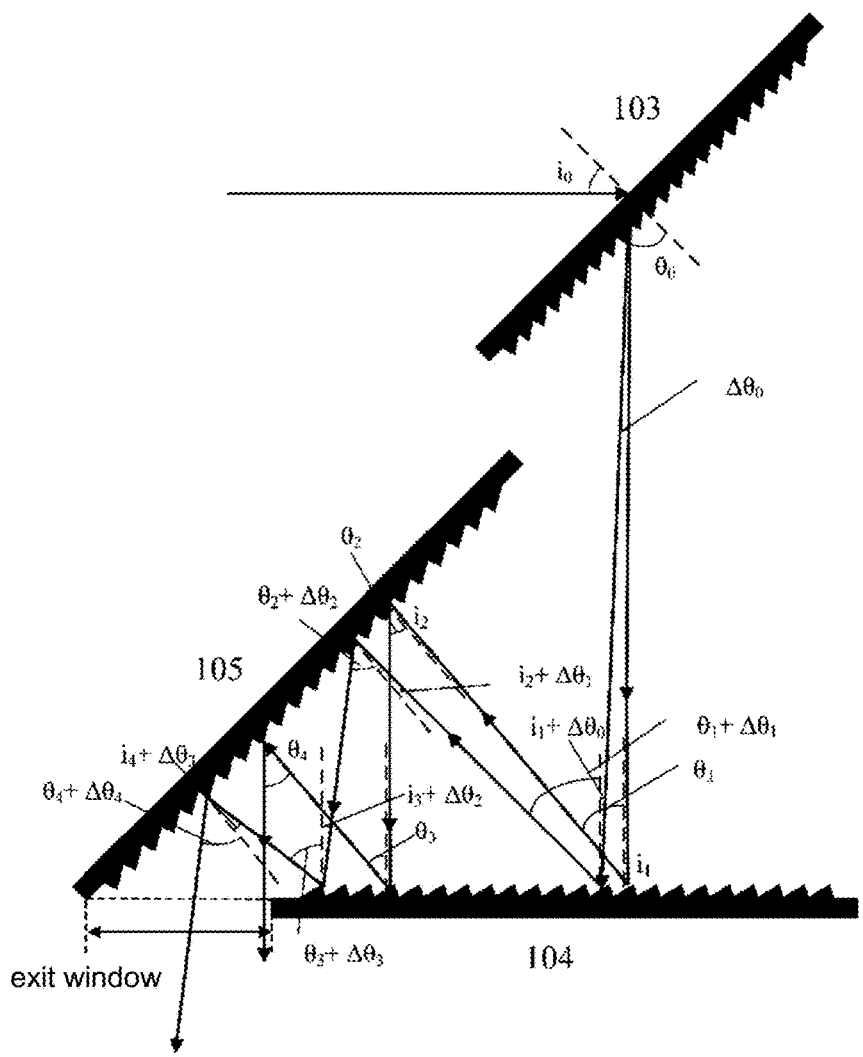
FIG. 4 is a schematic diagram of a two-grating angular dispersion amplification structure provided by an embodiment of the disclosure.

Taking a transmissive grating as an example, as shown in FIG. 4, when the incident light with the wavelength of $\lambda_0$ enters a preliminary grating, the incident angle and the diffraction angle are $i_0$ and $\theta_0$, respectively. After the incident light passes through the two-grating angular dispersion amplification unit, the $n^{th}$ incident angle and diffraction angle respectively are $i_n$ and $\theta_n$. When the incident light with the wavelength of $\lambda_0+\Delta\lambda$ enters the preliminary grating, the diffraction angle is $\theta_0+\Delta\theta_0$. After the incident light passes through the two-grating angular dispersion amplification unit, the $n^{th}$ diffraction angle is $\theta_n+\Delta\theta_n$, and the angular dispersion is calculated as follows:

after the incident light passes through the diffraction grating 103, the following grating equation is obtained:

$$d_1(\sin i_0 + \sin \theta_0) = m_0\lambda_0$$

$$d_1(\sin i_0 + \sin(\theta_0+\Delta\theta_0)) = m_0(\lambda_0+\Delta\lambda)$$

where $d_1$ is the grating constant of the diffraction grating 103, $i_0$ is the incident angle, and $\theta_0$ is the diffraction angle. The angular dispersion is:

$$\frac{d\theta_0}{d\lambda} = \frac{m_0}{d_1\cos(\theta_0)}$$

where $m_0$ is the diffraction order of the incident light passing through the diffraction grating 103. Taking the diffracted light and the incident light being at the same side as an example and combined with the first diffraction of the two gratings, a diffraction recurrence relation may be obtained:

$$d\theta_1 = \frac{\cos(i_1)}{\cos(\theta_1)}d\theta_0 - \frac{m}{d_2\cos(\theta_1)}d\lambda$$

where m is the diffraction order of the incident light in the two-grating angular dispersion amplification unit after passing through reflective diffractive grating (104 and 105), and $d_2$ is the grating constant of the reflective diffractive gratings (104 and 105). Based on the above relationship, the subsequent three times of diffraction may be calculated from the above relationship, and finally the angular dispersion of the fourth diffraction is:

$$\frac{d\theta_4}{d\lambda} = \frac{\cos(i_1)\cos(i_2)}{\cos(i_3)\cos(i_4)}\frac{m_0}{\cos(\theta_1)\cos(\theta_2)\cos(\theta_3)\cos(\theta_4)d_1\cos(\theta_0)} - \frac{\cos(i_2)\cos(i_3)}{\cos(\theta_2)\cos(\theta_3)}\frac{\cos(i_4)}{\cos(\theta_4)}\frac{m}{d_2\cos(\theta_1)} - \frac{\cos(i_3)\cos(i_4)}{\cos(\theta_3)\cos(\theta_4)}\frac{m}{d_2\cos(\theta_2)} - \frac{\cos(i_4)}{\cos(\theta_4)}\frac{m}{d_2\cos(\theta_3)} - \frac{m}{d_2\cos(\theta_4)}$$

Where $i_p$ and $\theta_p$ (p=1, 2, 3, 4) respectively are the incident angle and the diffraction angle of the fourth diffraction in the two-grating angular dispersion amplification unit. The center wavelength is $\lambda_c$=1,550 nm in this embodiment.

Optionally, the incident light perpendicularly enters the reflective diffractive grating 105, and the angle between the reflective grating 105 and the reflective diffractive grating 104 is set to be $\arcsin(m\cdot\lambda_c/d_2)$. In this way, the incident light with the wavelength of $\lambda_c$ enters the grating perpendicularly for four times, that is, $i_1$, $i_2$, $i_3$, and $i_4$ are all 0, $\theta_1=\theta_2=\theta_3=\theta_4=\theta$, and $di_n=d\theta_{n-1}$ (n=2, 3, 4), and the diffraction angle of the incident wavelength $\lambda_0$ is set to be $\theta$. The diffraction orders are $m_0$=1 and m=−1, and the angular dispersion near the center wavelength is:

$$\frac{\Delta\theta_4}{\Delta\lambda} = \frac{1}{d_2}\left(\frac{1}{\cos(\theta)} + \frac{1}{\cos^2(\theta)} + \frac{1}{\cos^3(\theta)} + \frac{1}{\cos^4(\theta)}\right) + \frac{1}{d_1\cos^4(\theta)\cos(\theta_0)}$$

In a specific embodiment, the parameters of the diffraction grating 103 are provided as follows:
grating constant: 1 μm,
size: 19 m×13.5 mm,
bandwidth: 1,525 nm-1,565 nm.

The parameters of the reflective diffractive gratings (104 and 105) are provided as follows:
grating constant: 1/600 μm,
size: 50 m×50 mm,
blazed wavelength: 1.6 μm.

After the incident light passes through the two-grating angular dispersion amplification unit, it is calculated that the angular dispersion is 85 times stronger than that of the first diffraction.

Note that a spectral enhancement range of the device is determined by the exit window of the two-grating angular dispersion amplification unit in FIG. 4, and the wavelength that may be emitted from the exit window determines the spectral enhancement range. According to the calculation of geometric parameters of the grating, the spectral enhancement range of a spectral resolution enhancement device based on two gratings in the embodiments is: 1545.8 nm-1565 nm.

Figure 5A:
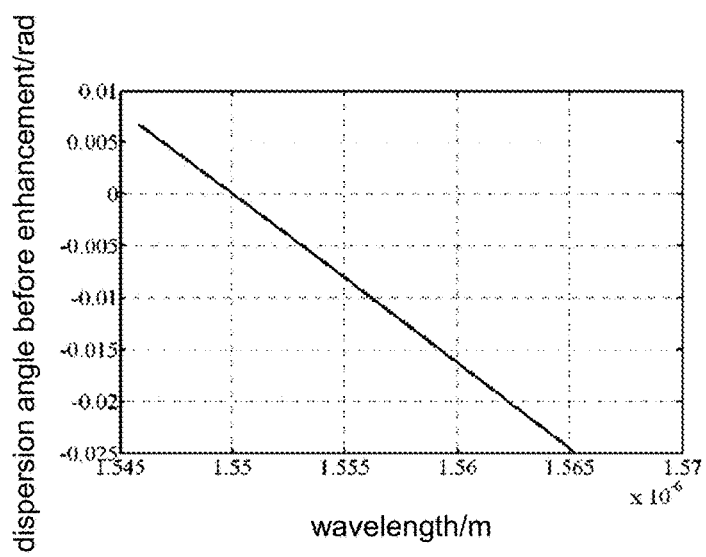
FIG. 5A is a schematic diagram of a simulation curve of the dispersion angle versus wavelength changes before enhancement provided by an embodiment of the disclosure.
Figure 5B:
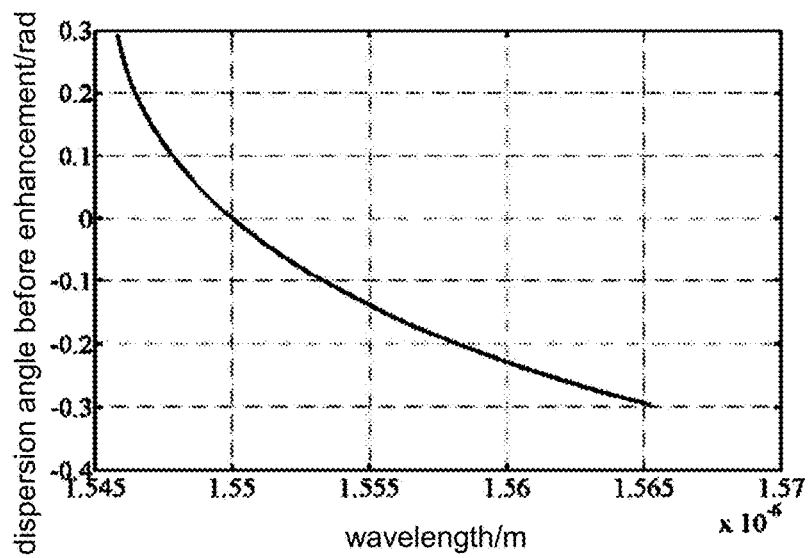
FIG. 5B is a schematic diagram of a simulation curve of the dispersion angle versus wavelength changes after enhancement provided by an embodiment of the disclosure.

Further, curves of angular dispersion versus wavelength before and after spectral resolution enhancement provided by this embodiment are shown in FIG. 5A and FIG. 5B. FIG. 5A shows that before passing through the two-grating angular dispersion amplification unit, the light beam to be measured only passes through one grating, the angular dispersion varies approximately linearly with wavelength, and the dispersion angle is −0.025 to 0.005 rad. FIG. 5B shows that after the light beam passes through the two-grating angular dispersion amplification unit, the diffraction angle is enlarged, the angular dispersion varies nonlinearly with the wavelength, and the dispersion angle increases to −0.3 to 0.3 rad. Since the angular dispersion varies nonlinearly with the wavelength, the position and wavelength are required to be calibrated on the detector 107.

Figure 6A:
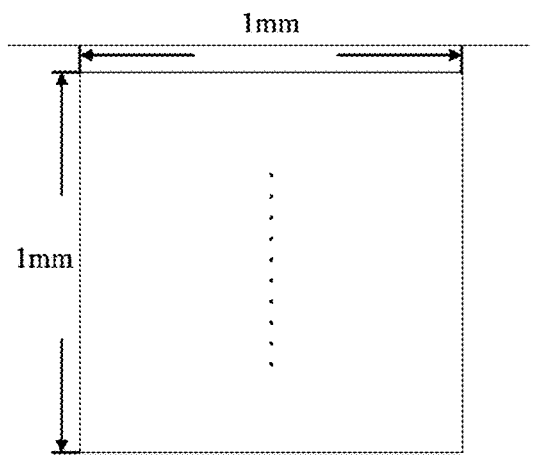
FIG. 6A is a simulation diagram of spectral line distribution before enhancement provided by an embodiment of the disclosure.
Figure 6B:
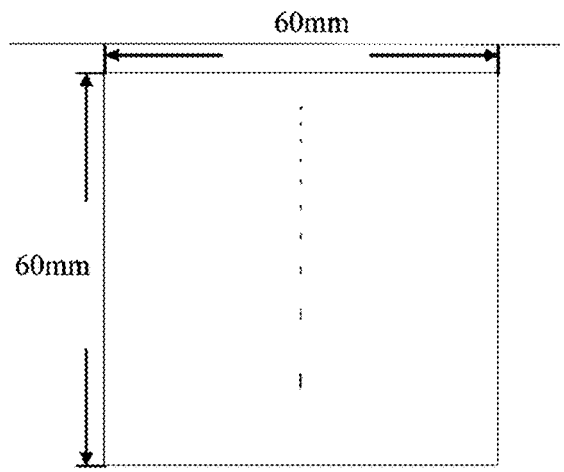
FIG. 6B is a simulation diagram of spectral line distribution after enhancement provided by an embodiment of the disclosure.

Further, simulation diagrams of spectral line distribution before and after the spectral resolution enhancement provided by this embodiment are respectively shown in FIG. 6A and FIG. 6B. Ten frequency points with the spectrum of 1548 nm-1551 nm are inputted at equal intervals, and the focal length of the imaging lens for the two detections is the same. FIG. 6A is a spectrum diagram obtained through a common grating spectrometer. A spectral line is linearly distributed, and because the angular dispersion is small, line dispersion is small, and the spectral line is distributed on an imaging surface of 1 m×1 mm. FIG. 6B is a spectrum diagram obtained after the incident light passes through the two-grating angular dispersion amplification unit (104 and 105). The spectral line is nonlinearly distributed, and since the angular dispersion is enhanced, the line dispersion is increased, and the spectral line is distributed on an imaging surface of 60 m×60 mm. On the other hand, the speckle size in a wavelength region where the angular dispersion enhancement multiple is larger significantly increases. In this diagram, the wavelength and position may be calibrated, and in addition, in the wavelength region where the enhancement multiple is high, the final resolution needs to be corrected for the effect of the speckle size.

Moreover, the difference between the transmissive spectral resolution enhancement device based on two gratings and the reflective spectral resolution enhancement device based on two gratings is that: the transmissive spectral resolution enhancement device may reduce the incident light beam width. After the light beam width is reduced, a divergence angle of the light beam becomes larger, the angular spectrum distribution becomes wider, and the imaging speckle becomes larger, such that the actual spectral resolution is a full width at half maximum (FWHM) of the actual speckle size. Regarding the reflective spectral resolution enhancement device, the light beam width remains the same, the imaging speckle remains the same, and the angular dispersion multiple is the increased multiple of the spectral resolution.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A spectral resolution enhancement device, comprising: a preliminary dispersion unit, a two-grating angular dispersion amplification unit, and a detection unit, wherein
the preliminary dispersion unit is configured to receive collimated incident light and emits light of different wavelengths in the incident light at different angles,
the two-grating angular dispersion amplification unit is configured to diffract the light of different wavelengths emitted from the preliminary dispersion unit at least three times, such that angular dispersions of the light of different wavelengths is enhanced, and emergent angle deviations of the light of different wavelengths are increased,
the detection unit is configured to detect the light of different wavelengths emitted from the two-grating angular dispersion amplification unit, and since the emergent angle deviations of the light of different wavelengths are increased, resolution of the detection unit for the light of different wavelengths is increased,
the two-grating angular dispersion amplification unit comprises a first blazed grating and a second blazed grating,
the first blazed grating receives the light emitted from the preliminary dispersion unit with different wavelengths and diffracts the light with different wavelengths to the second blazed grating,
the second blazed grating receives the light diffracted from the first blazed grating with different wavelengths and diffracts the light with different wavelengths to the first blazed grating, and the foregoing is repeated,
finally, diffracted light with different wavelengths is emitted to the detection unit after being diffracted by the first blazed grating or the second blazed grating,
when the diffracted light with different wavelengths is emitted to the detection unit after being diffracted by the first blazed grating, an incident angle of the light is changed from being greater than a Littrow angle to being less than the Littrow angle when the light is diffracted multiple times between the first blazed grating and the second blazed grating through arrangement of positions of the first blazed grating and the second blazed grating,
the detection unit includes: a beam splitter, an imaging lens, and a detector, the imaging lens is configured to focus the emitted light with different wavelengths on the detector, the detector is configured to detect the light with different wavelengths and emitted from the two-grating angular dispersion amplification unit.

2. The spectral resolution enhancement device according to claim 1, wherein the preliminary dispersion unit comprises: an incident slit, a collimating lens, and a diffraction grating, the incident light is incident through the incident slit, the collimating lens is configured to collimate the incident light passing through the incident slit and emits the incident light in parallel, the diffraction grating is configured to receive the incident light emitted from the collimating lens and emit the light of different wavelengths in the incident light at different angles.

3. The spectral resolution enhancement device according to claim 1, wherein by arranging the positions of the first blazed grating and the second blazed grating, the incident angle of the light is changed from being greater than the Littrow angle to being less than the Littrow angle when the light is diffracted multiple times between the first blazed grating and the second blazed grating, and when the incident angle reaches the Littrow angle after being diffracted multiple times, a diffraction angle is identical to the incident angle, and a light beam is emitted to the beam splitter after being diffracted multiple times in a reverse direction alone an original diffraction path.

4. The spectral resolution enhancement device according to claim 1, wherein an angular dispersion of $j^{th}$ grating diffraction is $D_j$, and a recurrence relationship is:

$$D_j = \frac{\cos(i_j)}{\cos(\theta_j)}D_{j-1} + \frac{m}{d\cos(\theta_j)}$$

wherein $D_{j-1}$ is an angular dispersion of $j-1^{th}$ grating diffraction, $i_j$ is an incident angle of $j^{th}$ diffraction, $\theta_j$ is a diffraction angle of the $j^{th}$ diffraction, m is a diffraction order of a blazed grating, and d is a grating constant.

5. The spectral resolution enhancement device according to claim 1, wherein if the diffracted light with different wavelengths is emitted to the detection unit after being diffracted by the first blazed grating, a width of an incident light beam received by the detection unit does not change, a size of an imaging speckle does not change, and an angular dispersion multiple of the light with different wavelengths is a spectral resolution enhancement multiple through the device, if the diffracted light having different wavelengths is emitted to the detection unit after being diffracted by the second blazed grating, the incident light beam received by the detection unit is reduced, a divergence angle of the reduced light beam is expanded, angular spectrum distribution is increased, the imaging speckle is increased, and spectral resolution of the device is a full width at half maximum of a detected speckle.

6. The spectral resolution enhancement device according to claim 2, wherein an angular dispersion of $j^{th}$ grating diffraction is $D_j$, and a recurrence relationship is:

$$D_j = \frac{\cos(i_j)}{\cos(\theta_j)}D_{j-1} + \frac{m}{d\cos(\theta_j)}$$

wherein $D_{j-1}$ is an angular dispersion of $j-1^{th}$ grating diffraction, $i_j$ is an incident angle of $j^{th}$ diffraction, $\theta_j$ is a diffraction angle of the $j^{th}$ diffraction, m is a diffraction order of a blazed grating, and d is a grating constant.

7. The spectral resolution enhancement device according to claim 3, wherein an angular dispersion of $j^{th}$ grating diffraction is $D_j$, and a recurrence relationship is:

$$D_j = \frac{\cos(i_j)}{\cos(\theta_j)}D_{j-1} + \frac{m}{d\cos(\theta_j)}$$

wherein $D_{j-1}$ is an angular dispersion of $j-1^{th}$ grating diffraction, $i_j$ an incident angle of $j^{th}$ diffraction, $\theta_j$ is a diffraction angle of the $j^{th}$ diffraction, m is a diffraction order of a blazed grating, and d is a grating constant.

* * * * *